United States Patent
Lemieux et al.

(10) Patent No.: US 9,470,147 B2
(45) Date of Patent: Oct. 18, 2016

(54) APPARATUS AND METHOD FOR DETERMINING A TEMPERATURE DISTRIBUTION OF A HOT-TEMPERATURE FLOW IN A TURBINE ENGINE

(71) Applicant: Siemens Energy, Inc., Orlando, FL (US)

(72) Inventors: Dennis H. Lemieux, Casselberry, FL (US); Vinay Jonnalagadda, Maitland, FL (US); Paul J. Zombo, Cocoa, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 528 days.

(21) Appl. No.: 14/077,338

(22) Filed: Nov. 12, 2013

(65) Prior Publication Data

US 2015/0132102 A1    May 14, 2015

(51) Int. Cl.
*F01D 21/00* (2006.01)
*F02C 7/00* (2006.01)

(52) U.S. Cl.
CPC ............ *F02C 7/00* (2013.01); *F05D 2260/80* (2013.01); *F05D 2270/303* (2013.01)

(58) Field of Classification Search
CPC . F02C 7/00; F05D 2260/80; F05D 2270/303
See application file for complete search history.

(56) References Cited

U.S. PATENT DOCUMENTS

| | | |
|---|---|---|
| 4,934,137 A | 6/1990 | MacKay |
| 7,231,817 B2 | 6/2007 | Smed et al. |
| 7,294,817 B2 | 11/2007 | Voigt et al. |
| 7,489,811 B2 | 2/2009 | Brummel et al. |
| 7,690,840 B2 | 4/2010 | Zombo et al. |
| 8,063,372 B2 | 11/2011 | Lemieux et al. |
| 8,184,151 B2 | 5/2012 | Zombo et al. |
| 8,413,493 B1 | 4/2013 | Polywoda, III |
| 8,439,630 B2 | 5/2013 | Lemieux et al. |
| 2004/0101023 A1 | 5/2004 | Choi |
| 2006/0088793 A1 | 4/2006 | Brummel et al. |
| 2007/0107504 A1 | 5/2007 | Smed et al. |
| 2012/0098940 A1 | 4/2012 | Zombo et al. |
| 2012/0162192 A1 | 6/2012 | Wang et al. |
| 2012/0194667 A1 | 8/2012 | Banerjee et al. |
| 2012/0281084 A1 | 11/2012 | Hatcher et al. |
| 2015/0063412 A1* | 3/2015 | Badami ............... G01J 5/0088 374/121 |

* cited by examiner

*Primary Examiner* — Mark R Gaworecki

(57) ABSTRACT

Apparatus and method for determining a two-dimensional temperature distribution in a cross-sectional path of a hot-temperature flow in a turbine engine (10). A grid (22, 24, 38) is located in a path of a hot-temperature flow in the turbine engine. A thermal imager (34) has a field of view configured to sense infrared emissions from the grid. A processor (50) is configured to generate data indicative of a two-dimensional temperature distribution in a cross-sectional path of the flow based on the sensed infrared emissions.

19 Claims, 2 Drawing Sheets

APPARATUS AND METHOD FOR DETERMINING A TEMPERATURE DISTRIBUTION OF A HOT-TEMPERATURE FLOW IN A TURBINE ENGINE

FIELD OF THE INVENTION

The present invention is generally related to thermography, and, more particularly, to an apparatus and method for determining a two-dimensional temperature distribution in a cross-sectional path of a hot-temperature flow in a turbine engine.

BACKGROUND OF THE INVENTION

Notwithstanding of advances which have been made in this technical field, there continues to be a need for improved apparatuses and/or techniques useful for monitoring high-temperature regions of interest in a turbine engine.

BRIEF DESCRIPTION OF THE DRAWINGS

The invention is explained in the following description in view of the drawings that show.

DETAILED DESCRIPTION OF THE INVENTION

The present inventors have innovatively recognized certain limitations in connection with known apparatuses and techniques for monitoring high-temperature regions of interest in a turbine engine. For example, structural and/or thermal constraints that can arise in the context of a confined space in a turbine engine have prevented acquisition of on-line information indicative of a temperature distribution in a path of a hot-temperature flow in the turbine engine. In view of such recognition, the present inventors propose an innovative apparatus and method effective to reliably and cost-effectively determine a two-dimensional temperature distribution in a cross-sectional path of a hot-temperature flow in a turbine engine. This determination may be performed practically in real-time.

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent unless otherwise do described. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
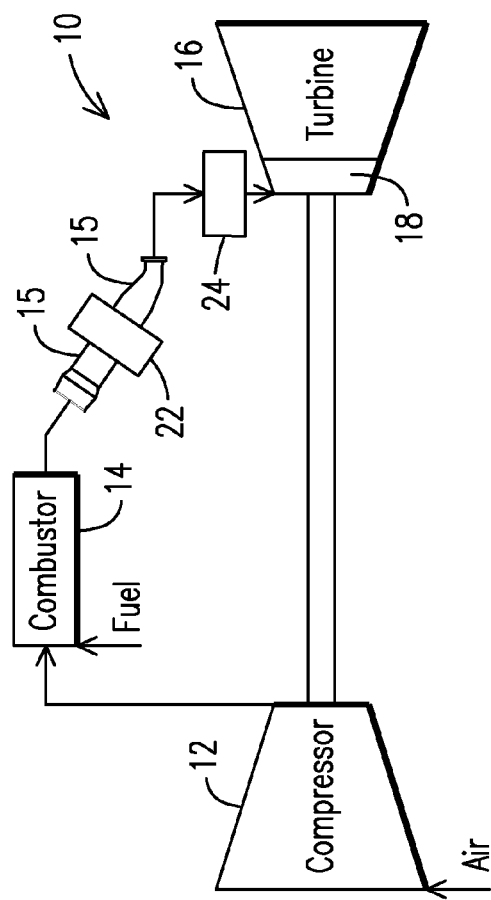
FIG. 1 is a simplified schematic of a turbine engine, including aspects of the present invention.

FIG. 1 is a simplified schematic of a combustion engine, such as a gas turbine engine 10. As will be appreciated by those skilled in the art, turbine engine 10 includes a compressor 12 for compressing air, a combustor 14 (in practice a plurality of combustors but just one combustor is shown in FIG. 1 for simplicity of illustration) for mixing the compressed air with fuel and igniting the mixture, and a turbine section 16 (as may comprise a plurality of expansion stages) for producing power. By way of example, the illustrated expansion stage 18 may represent a first expansion stage in turbine section 16. Combustor 14 produces a hot-temperature flow (e.g., gases flowing at approximately 1700° C. or more), which passes from combustor 14 through a transition 15 and into turbine section 18.

As will be appreciated by those skilled in the art, one of the functions of transition 15 is to configure the profile of the flowing gas from a cylindrical shape to an annular shape, as would be useful for a typical design of turbine section 16. Since the thermodynamic efficiency of a turbine engine is influenced by the temperature of the gas flow passing through transition 15 and entering turbine section 16, the present inventors have recognized the desirability of extracting on-line information conducive to, for example, determining a temperature distribution in the path of the hot-temperature flow in the turbine engine. Accordingly, the present inventors propose utilization of a grid structure, (e.g., grid, screen, mesh, generically "grid") which functions as a radiance emitter, e.g., an electrically unpowered (e.g., passive) radiance emitter, and which may be located in a path of the hot-temperature flow in a turbine engine to determine the temperature distribution in the path of the hot-temperature flow. In one non-limiting embodiment, a grid 22 may be located downstream combustor 14 in transition 15 where such grid may have a cylindrical shape. In another non-limiting embodiment, a grid 24 may be located between combustor 14 and first expansion stage 18 of turbine section, where such grid may have an annular shape. This grid structure may effectively constitute a flow non-directing structure (e.g., instrumentation) which does not need any cooling and which allows extracting on-line information to, for example, determining a temperature distribution in the path of the hot-temperature flow in the turbine engine. In one non-limiting embodiment, this extracting of information may be performed over a relatively short period of time (e.g., over a few hours of operation) since the grid structure could be designed to oxidize (e.g., harmlessly disperse) over such a period of time.

Regardless of the location of the grid, the grid should be constructed from a sufficiently oxidation-resistant, temperature-resistant material to appropriately withstand the relatively high-temperatures and high velocities of the gas flow passing through the grid. Additionally, the grid material should have a sufficiently stable and known emissivity value (ε) over the high temperature range of turbine operation. One non-limiting example of a temperature range may be from approximately 1000° C. to approximately 1700° C. or more. In one non-limiting embodiment, the value of the emissivity (ε) may be relatively high (e.g., the value of ε may range from approximately 0.7 to approximately 0.9). Non-limiting examples of materials from which the grid may be constructed may be rhodium platinum (e.g., rhodium platinum wire), chromium oxide, cobalt nickel, platinum, ceramic, cermet composite (i.e., a composite material comprising ceramic and metallic materials). As will be appreciated by those skilled in the art, a cermet may be designed to include the optimal properties of both a ceramic, such as high temperature resistance, oxidation resistance, and those of a metal, such as the ability to undergo plastic deformation.

Figure 2:
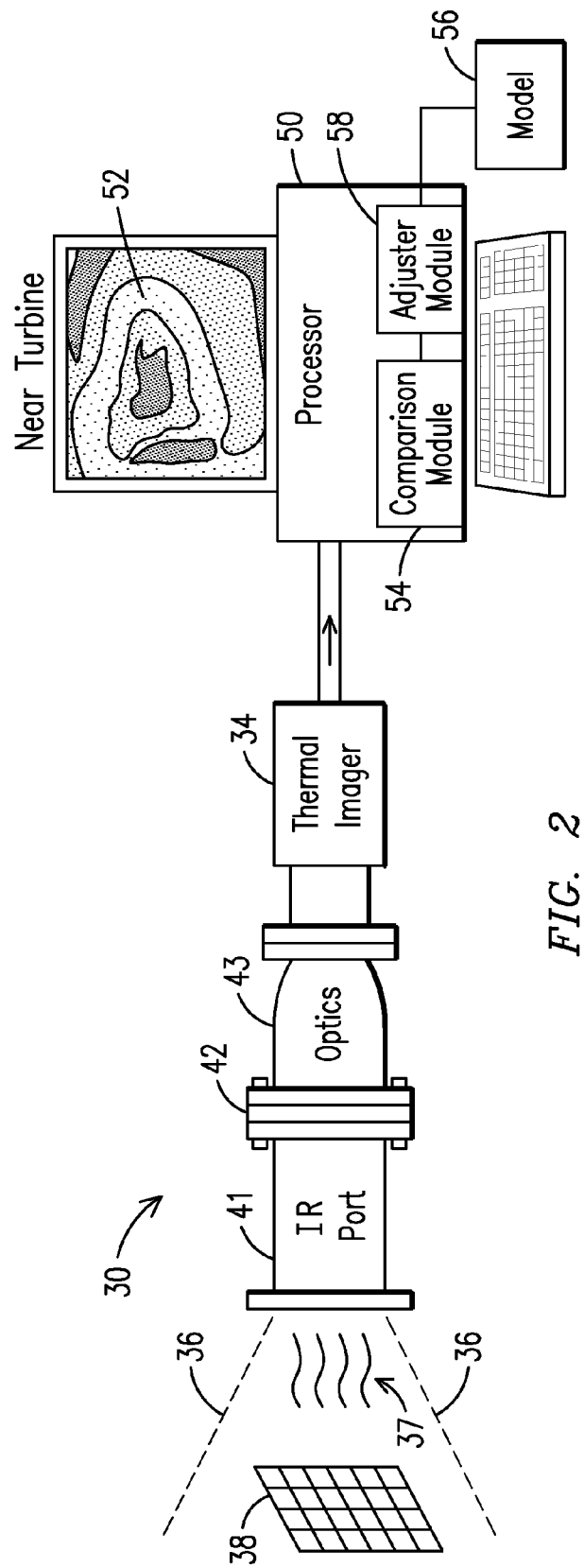
FIG. 2 is a schematic representation of one non-limiting embodiment of an apparatus configured for determining a two-dimensional temperature distribution in a cross-sectional path of a hot flow based on sensed infrared emissions from a grid located in the path of the hot flow.

FIG. 2 is a schematic representation of one example embodiment of a thermographic apparatus 30, as may be configured to determine a two-dimensional temperature distribution in a cross-sectional path of a hot flow based on sensed infrared emissions. In one non-limiting embodiment, a thermal imager 34 senses within a field of view (as may be conceptually defined by lines 36) infrared (IR) emissions 37 (e.g., near IR (NIR) spectral emissions) from grid 38 located in the path of the hot-temperature flow in the turbine engine. In one non-limiting embodiment, thermal imager 34 may comprise a focal plane array sensor (e.g., an array of charged coupled devices (CCD)) to measure the emitted radiance of the component. In one non-limiting embodiment, an IR port 41 may be arranged to provide a direct "line of sight" to grid 38.

A pressure barrier 42 may be used to pass the IR emissions from IR port 41 to an optical assembly 43 for appropriate optical signal conditioning (e.g., focal length selection and appropriate optical magnification) prior to such signals being received by thermal imager 34. A processor 50 may be coupled to thermal imager 34 to generate data indicative of a two-dimensional temperature distribution 52 in the cross-sectional path of the flow based on the sensed infrared emissions. The data may be calibrated using techniques well-understood so that the two-dimensional temperature distribution may comprise absolute values, relative values or both. The two-dimensional temperature distribution of the flow may be determined under a plurality of operational conditions of the turbine engine. This may be used to evaluate how boundary conditions may be affected under different operational conditions of the turbine engine, during transients, etc. In one non-limiting application, the determined two-dimensional temperature distribution of the flow may be used to modify (e.g., hardware modifications) at least one component of the turbine engine.

Figure 3:
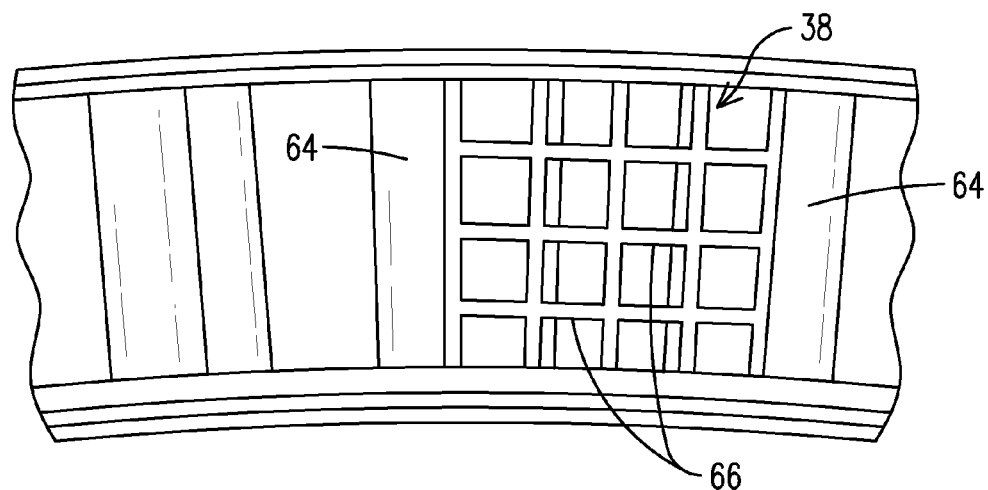
FIG. 3 is a front elevational view where a grid embodying aspects of the present invention is shown as being located between two flow-directing components (e.g., vanes) of the turbine engine of FIG. 1.

As may be appreciated in FIG. 3, in one non-limiting embodiment, grid 38 may be located between two flow-directing, cooled (e.g., air-cooled) components 64 of the turbine engine to determine the two-dimensional temperature distribution of the flow between flow-directing components 64. This temperature distribution may be used to evaluate a respective aerodynamic functionality provided by flow-directing components 64, and in turn may be used to modify at least one of flow-directing components 64 based on a result from the evaluating.

Figure 4:
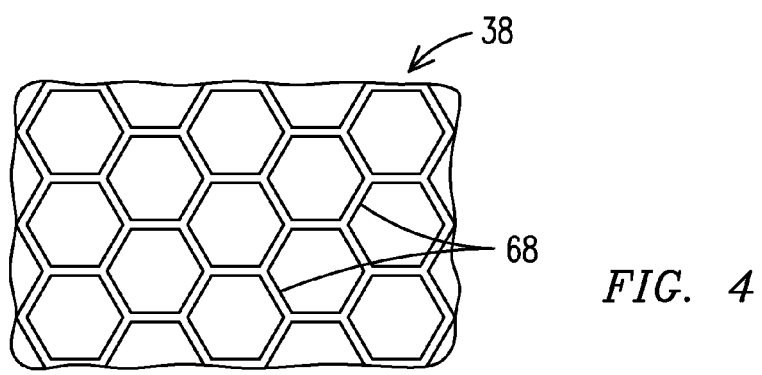
FIGS. 4 and 5 are respective front elevational views illustrating respective non-limiting examples of structural patterns in a grid embodying aspects of the present invention.
Figure 5:
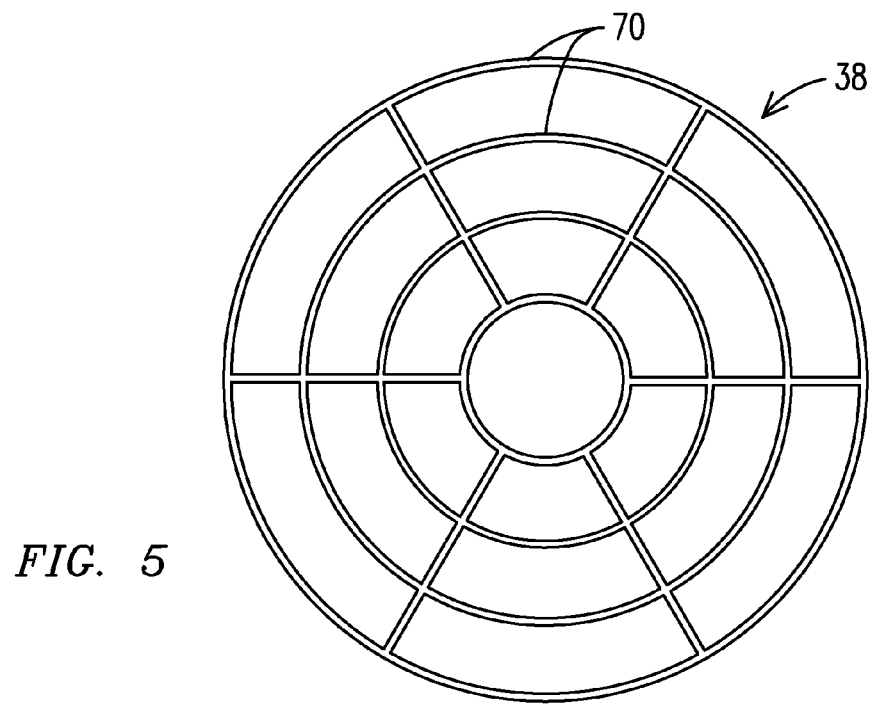

It will be now appreciated that grid 38 may be constructed in various ways, such as a check pattern 66 (FIG. 3), a honeycomb pattern 68 (FIG. 4), an annular pattern 70 (FIG. 5). Regardless of the specific construction of grid 38, it will be appreciated by those skilled in the art that the interspacing between the structural elements that make up the grid should be sufficiently spread apart, and additionally such elements should be sufficiently thin to reduce or avoid flow disruption to the hot gas passing through the grid while being sufficiently close to provide an appropriate visualization to the two-dimensional temperature distribution of the flow. In one non-limiting embodiment, grid 38 may comprise a wire (e.g., relatively thin wire) comprising a ceramic coating, as may provide a lower thermal conductivity, which may be helpful to reduce inaccuracies that could otherwise develop in response to thermal gradients that could develop in a wire having a relatively high thermal conductivity. In one non-limiting embodiment, as may be appreciated in FIG. 2, a comparison module 54 may be configured to compare the two-dimensional temperature distribution of the flow relative to a temperature distribution based on a model 56, e.g., computational flow dynamics (CFD). An adjuster module 58 may be configured to adjust model 56 based on a result of comparison module 54. It will be appreciated that modules 54, 58 need not be integrated in processor 50 since such processing functionality may be performed offline.

It will be appreciated that certain aspects of an example inventive apparatus, as may be used for determining a two-dimensional temperature distribution of a hot-temperature flow in a turbine engine and methods disclosed herein, may be implemented by any appropriate processor, or processor system using any appropriate programming language or programming technique. The system can take the form of a hardware embodiment, a software embodiment or an embodiment comprising both hardware and software elements. In one embodiment, the system may be implemented by way of software and hardware (e.g., thermal imager, processor, processing modules), which may include but is not limited to firmware, resident software, microcode, etc. Furthermore, parts of the processor system can take the form of a computer program product accessible from a computer-usable or computer-readable medium providing program code for use by or in connection with a computer or any instruction execution system. Examples of computer-readable media may include non-transitory tangible computer-readable media, such as a semiconductor or solid-state memory, magnetic tape, a removable computer diskette, a random access memory (RAM), a read-only memory (ROM), a rigid magnetic disk and an optical disk. Present examples of optical disks may include compact disk-read only memory (CD-ROM), compact disk-read/write (CD-RAN) and DVD. An interface display may be a tablet, flat panel display, PDA, or the like.

In one example embodiment, a processing system suitable for storing and/or executing program code may include in one example at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the presently available types of network adapters.

While various embodiments of the present invention have been shown and described herein, it will be apparent that such embodiments are provided by way of example only.

Numerous variations, changes and substitutions may be made without departing from the invention herein. Accordingly, it is intended that the invention be limited only by the spirit and scope of the appended claims.

The invention claimed is:

1. A method comprising:
   locating a grid in a path of a hot-temperature flow between a combustor and a first expansion stage of a turbine section in a turbine engine;
   sensing infrared emissions from the grid over a period of time of operation of the turbine engine;
   determining a two-dimensional temperature distribution in a cross-sectional path of the flow based on the sensed infrared emissions; and
   configuring the grid to oxidize and harmlessly disperse in the hot-temperature flow over the period of time of operation of the turbine engine so that the grid is absent between the combustor and the first expansion stage of the turbine section during subsequent operation of the turbine engine.

2. The method of claim 1, wherein the determining comprises determining the two-dimensional temperature distribution of the flow under a plurality of operational conditions of the turbine engine.

3. The method of claim 1, further comprising modifying a design of at least one component of the turbine engine based on the determined two-dimensional temperature distribution of the flow.

4. The method of claim 1, further comprising comparing the determined two-dimensional temperature distribution of the flow relative to a temperature distribution based on a model.

5. The method of claim 4, further comprising adjusting the model for the temperature distribution based on a result of the comparing.

6. The method of claim 1, wherein the locating comprises locating the grid between a combustor and a first expansion stage of the turbine engine.

7. The method of claim 1, wherein the locating comprises locating the grid between two flow-directing components of the turbine engine.

8. The method of claim 7, further comprising evaluating a respective aerodynamic functionality provided by the two flow-directing components based on the determined two-dimensional temperature distribution of the flow between the two flow-directing components of the turbine engine.

9. The method of claim 8, further comprising modifying a design of at least one the two flow-directing components based on a result from the evaluating.

10. An apparatus comprising:
    a grid located in a path of a hot-temperature flow between a combustor and a first expansion stage of a turbine section in a turbine engine;
    a thermal imager having a field of view configured to sense infrared emissions from the grid over a period of time of operation of the turbine engine; and
    a processor to generate data indicative of a two-dimensional temperature distribution in a cross-sectional path of the flow based on the sensed infrared emissions,
    wherein the grid is configured to oxidize and harmlessly disperse in the hot-temperature flow over the period of time of operation of the turbine engine so that the grid is absent between the combustor and the first expansion stage of the turbine section during subsequent operation of the turbine engine.

11. The apparatus of claim 10, further comprising a comparison module configured to compare the two-dimensional temperature distribution of the flow relative to a temperature distribution based on a model.

12. The apparatus of claim 11, further comprising an adjuster module configured to adjust the model based on a result of the comparison module.

13. The apparatus of claim 10, wherein the grid is located between a combustor and a first expansion stage of the turbine engine.

14. The apparatus of claim 10, wherein the grid is located between two flow-directing components of the turbine engine.

15. The apparatus of claim 10, wherein the grid comprises a rhodium platinum wire.

16. The apparatus of claim 10, wherein the grid comprises a wire having a ceramic coating.

17. The apparatus of claim 10, wherein the grid comprises a material selected from the group consisting of rhodium platinum, chromium oxide, cobalt nickel, platinum, ceramic and a cermet.

18. The apparatus of claim 10, wherein the grid comprises a pattern selected from the group consisting of a check pattern, a honeycomb pattern, and an annular pattern.

19. A turbine engine comprising a grid located in a path of a hot-temperature flow between a combustor and a first expansion stage of a turbine section in the turbine engine, wherein the grid in response to passing flow emits detectable infrared emissions over a period of time of operation of the turbine engine, the infrared emissions containing information indicative of a two-dimensional temperature distribution in a cross-sectional path of the flow, wherein the grid is configured to oxidize and harmlessly disperse in the hot-temperature flow over the period of time of operation of the turbine engine so that the grid is absent between the combustor and the first expansion stage of the turbine section during subsequent operation of the turbine engine.

* * * * *